United States Patent [19]

Bowman-Shaw

[11] 3,756,437

[45] Sept. 4, 1973

[54] SIDE LOADER VEHICLES

[75] Inventor: George Neville Bowman-Shaw, Toddington, Bedfordshire, England

[73] Assignee: Lancer Boss Limited, Leighton Buzzard, Bedfordshire, England

[22] Filed: Sept. 13, 1971

[21] Appl. No.: 179,946

[30] Foreign Application Priority Data

Sept. 17, 1970  Great Britain.................. 44,525/70

[52] U.S. Cl. ............................................ 214/75 G
[51] Int. Cl. ............................................ B60p 1/44
[58] Field of Search................... 214/660, 670, 730, 214/75 G; 280/106; 180/89; 296/28

[56] References Cited
UNITED STATES PATENTS

| 2,752,056 | 6/1956 | Lull...................................... 214/730 |
| 3,168,956 | 2/1965 | Jinks et al.......................... 214/730 |
| 2,775,357 | 12/1956 | Arment.............................. 214/390 |
| 2,829,785 | 4/1958 | Pitts................................... 214/730 |

Primary Examiner—Gerald M. Forlenza
Assistant Examiner—Lawrence J. Oresky
Attorney—Snyder, Brown & Ramik

[57] ABSTRACT

A side loader vehicle chassis comprises a box-like frame of generally U-shaped configuration in plan having a portion forming one longitudinal side portion midlength of the vehicle and two spaced portions coplanar with and normal to the side portion to bound a mast recess, and at least one extension extending generally longitudinally of the vehicle from the outer portions recess bounding portion for supporting the frame on front and rear road wheel suspensions and to support the vehicle decks, tracks for the mast extending along the recess bounding frame portions.

6 Claims, 2 Drawing Figures

SIDE LOADER VEHICLES

BACKGROUND OF THE INVENTION

1. Field of the Invention

This invention relates to side loader vehicles and more particularly to chassis for side loader vehicles.

A side loader vehicle comprises front and rear body portions respectively supported on the front road wheels and rear road wheels and interconnected at one side of the vehicle by a backbone unit leaving a recess from the backbone unit across the vehicle between the front and rear body portions into which a mast assembly is mounted and capable of being traversed across the recess from the backbone to the opposite side of the vehicle. The mast carries a carriage which may be raised and lowered on the mast and itself carries forks which can be inserted beneath a load to lift it in the manner of a fork lift truck. One of the body portions usually the front body portion carries on one side of it a driver's cab or the cab may be mounted for traversing across the vehicle and the other body portion usually the rear body portion supports the primemover of the vehicle which also includes means for energising hydraulic circuits operating the various hydraulic mechanisms for traversing the mast, raising and lowering the carriage and for other purposes when the vehicle is in use.

2. Description of prior art

Hitherto in such side loader vehicles the backbone structure has been of a rigid nature somewhat complicated in construction frequently involving the use of two tubular members firmly interconnected one above the other and extending fore and aft of the vehicle uniting the front and rear body portions.

When the vehicle is driven over the ground, any unevenness of the ground will tend to cause the front or back body portion to swing in a vertical direction about the backbone structure which is subjected to large torsional stresses, necessitating the backbone structure having to be designed to withstand these stresses.

The main object of the present invention is to provide chassis for a side loader vehicle in which the aforesaid disadvantages are reduced.

SUMMARY

According to the present invention a chassis or body frame for a side loader vehicle comprises a box-like frame of generally U-shaped configuration in plan having a portion forming one longitudinal side portion midlength of the vehicle and two spaced portions coplanar with and normal to the side portion to bound a mast recess, and at least one extension extending generally longitudinally of the vehicle from the outer portions of each recess bounding portion for supporting the frame on front and rear road wheel suspensions and to support the vehicle decks, tracks for the mast extending along the recess bounding frame portions.

BRIEF DESCRIPTION OF THE DRAWINGS

In order that the invention may be more fully understood an embodiment in accordance therewith will now be described by way of example with reference to the accompanying drawings in which.

DESCRIPTION OF PREFERRED CONSTRUCTION

Figure 1:
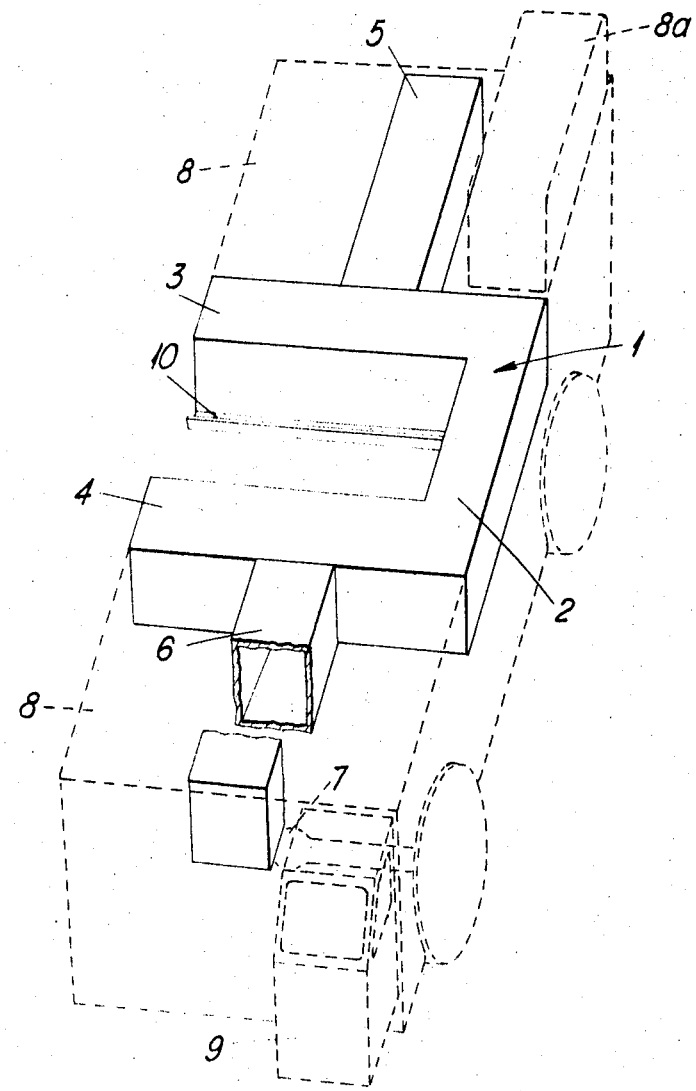
FIG. 1 shows a side loader chassis or body frame in perspective.

Referring to the drawings, the chassis or body frame comprises a box-like frame 1 of generally U-shaped configuration in plan having a base portion 2 forming a longitudinal side portion mid-length of the vehicle, and two spaced arm portions 3, 4 coplanar with and normal to the base portion 2, bounding the mast recess transversely across the vehicle.

Each of the portions 2,3, 4 is of rectangular hollow box construction, formed of welded or otherwise interconnected steel plates, the open ends of the portions 3, 4 being closed by steel plates. This frame may be built up of unitary U-shaped top and bottom plates with side and end walls welded or otherwise rigidly secured thereto. Alternatively each portion 2,3, 4 may be formed as a rectangular box, the portions being joined at their adjacent ends, and extending across the end of the other and welded or otherwise secured together, or the adjacent ends may be connected at 45° or any other angle or with side plates of one overlying and connected to the top or bottom plates of the other.

Extending forwardly and rearwardly are extensions 5, 6 of box construction preferably as shown mid-length of the portions 3, 4 or in prolongation of the portion 2, to form the frame of the front and rear body portions of the vehicle. The extensions 5, 6 may also be coplanar with the portions 2,3, 4 and reinforcing gussets or other reinforcing means may be provided at the angles between any or all of the portions 2–6.

The portions 5, 6 are provided with mounting means by which they are supported in the vehicle on the front and rear road wheel suspensions 7 of the vehicle. Decks 8 for the front and rear body portions of the vehicle are mounted on the portions 5, 6 and may extend over the portions 3, 4 and portion 2 if desired. The decks support the vehicle prime-mover 8a and the drivers cab 9, or the cab may be mounted as shown on the front or rear end of the vehicle for transverse movement thereacross, but this form of cab mounting forms no part of the present invention and requires no further description here.

Figure 2:
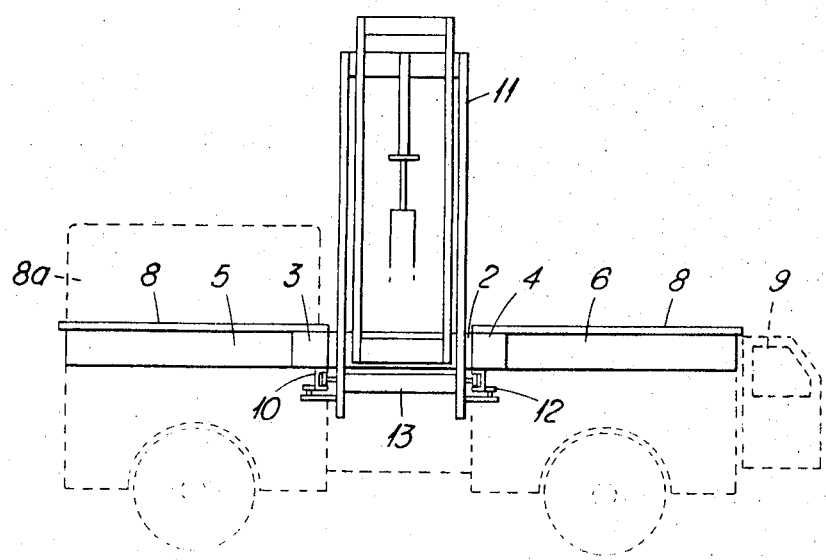
FIG. 2 is a side elevation taken from the left in FIG. 1.

The guides 10 for the mast are carried by the portions 3, 4 and while they may be on the inner side walls thereof they are preferably as shown in FIG. 2 supported underneath the portions 3,4. Thus the mast 11 can be supported on a carriage 13 running in the guides close to the ground and provided with members 12 which engage behind the guides 10 and help to prevent the portions 3,4 from spreading.

Thus a simple, economically constructed rigid chassis is provided which is stronger than existing chassis for side loaders and ensures rigidity in use.

I claim:

1. A side loader vehicle chassis comprising a U-shaped frame of box-like construction, the base of said frame extending longitudinally of said vehicle, the arms of said frame extending transversely of said vehicle and bounding a fork lift mast recess, said base and arms being coplanar and rigidly secured together, at least one extension longitudinally of said vehicle secured to each of said arms and extending away from said recess, front and rear road wheel suspensions each supporting one of said extensions, decks on said extensions, and tracks extending along said arms for supporting travelling carriage means engaged in said tracks and carrying a fork lift mast, said arms and said base being of rectangular hollow box construction in cross section.

2. A chassis according to claim 1, wherein said frame is built up of vertically spaced unitary U-shaped top and bottom plates with substantially vertical side and end walls rigidly connected between them.

3. A chassis according to claim 1, wherein each of said longitudinal extensions from said arms are of hollow box construction in cross section.

4. A chassis according to claim 1, wherein each of said longitudinal extensions from said arms is coplanar with said arms and is rigidly secured at one end to said arm.

5. A chassis according to claim 1 wherein said longitudinal extensions are formed as extensions of said base along one side of said vehicle.

6. A chassis according to claim 1, wherein said mast carriage means have members engaging the opposite sides of said arms to said recess to prevent spreading of said arms.

* * * * *